F. M. McMEEKIN.
Improvement in Cotton-Gins.
No. 115,226.            Patented May 23, 1871.
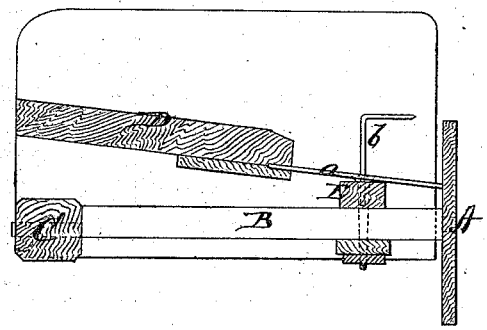
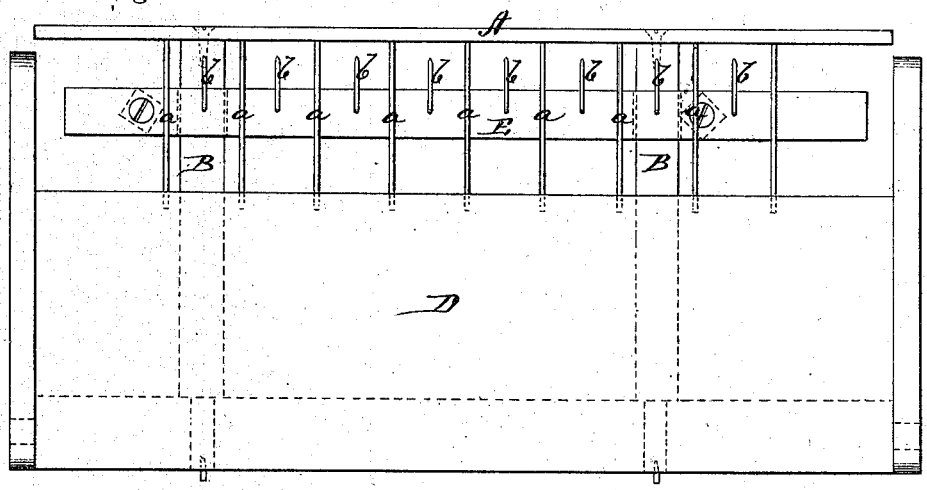

United States Patent Office.

FRANCIS M. McMEEKIN, OF MORRISON'S MILLS, FLORIDA.

Letters Patent No. 115,226, dated May 23, 1871.

IMPROVEMENT IN COTTON-GINS.

The Schedule referred to in these Letters Patent and making part of the same.

*To all whom it may concern:*

Be it known that I, FRANCIS M. MCMEEKIN, of Morrison's Mills, in the county of Putnam and State of Florida, have invented a new and valuable Improvement in Cotton-Gins; and I do hereby declare that the following is a full, clear, and exact description of the construction and operation of the same, reference being had to the annexed drawing making a part of this specification, and to the letters and figures of reference marked thereon.

Figure 1 of the drawing is my improvement in plan view, and

Figure 2 is a transverse vertical section of the same.

My invention is intended more particularly as an improvement on or attachment to the cotton-gin patented by McCarthy, 1840, and extended in 1854; but it may be used with gins of similar construction; and It consists in combining a line of angular teeth with the doffer of the McCarthy gin.

A represents the doffer or stripper, held in correct position by gauge-rods B B, which connect the doffer with a shaft, C, under the feed-board D.

$a\ a$ are the teeth or grate of the feed-board D.

My improvement may be called a shaker or agitator, and is secured to the gauge-rods B B a few inches from the doffer A.

The shaker is composed of a row of angular teeth, $b\ b$, set in a suitable rod, E, of wood.

These teeth pass upright between the teeth $a\ a$, and then bend at a right angle or less toward the doffer.

The shaker gets its motion from the doffer communicated through the gauge-rods, and, when in motion, the horizontal portion of the teeth $b\ b$ vibrates vertically above the grate or teeth $a\ a$ of the feed-board and agitates the cotton in front of the doffer, shaking out the loose seed and feeding the cotton to the gin.

Having thus fully described my invention,

What I claim as new, and desire to secure by Letters Patent, is—

The angular-toothed shaker E $b$, constructed as described, and operating in combination with the doffer and teeth or grate on the feed-board of a cotton-gin, substantially as and for the purposes herein set forth.

In testimony that I claim the above I have hereunto subscribed my name in the presence of two witnesses.

F. M. McMEEKIN.

Witnesses:
J. W. TURNER, Sr.,
J. W. TURNER, Jr.